(12) United States Patent
Fulgham et al.

(10) Patent No.: US 12,252,097 B1
(45) Date of Patent: Mar. 18, 2025

(54) LADDER RACK AND METHOD OF USE

(71) Applicants: Jason Fulgham, Keller, TX (US);
Jarrett Armstrong, Keller, TX (US);
Justin Smith, Celina, TX (US)

(72) Inventors: Jason Fulgham, Keller, TX (US);
Jarrett Armstrong, Keller, TX (US);
Justin Smith, Celina, TX (US)

(*) Notice: Subject to any disclaimer, the term of this patent is extended or adjusted under 35 U.S.C. 154(b) by 155 days.

(21) Appl. No.: 18/134,363

(22) Filed: Apr. 13, 2023

Related U.S. Application Data

(60) Provisional application No. 63/403,527, filed on Sep. 2, 2022.

(51) Int. Cl.
*B60R 9/06* (2006.01)

(52) U.S. Cl.
CPC .................................. *B60R 9/06* (2013.01)

(58) Field of Classification Search
CPC ............................. B60R 9/06; B60R 9/0485
USPC .......................... 224/519, 531, 532, 533, 535
See application file for complete search history.

(56) References Cited

U.S. PATENT DOCUMENTS

| | | | | |
|---|---|---|---|---|
| 4,298,151 A * | 11/1981 | O'Connor | ................. | B60R 9/10 224/532 |
| 4,676,413 A * | 6/1987 | Began | ....................... | B60R 9/10 224/535 |
| 5,190,195 A * | 3/1993 | Fullhart | ..................... | B60R 9/10 224/532 |
| 6,039,228 A * | 3/2000 | Stein | ......................... | B60R 9/06 224/532 |
| 6,089,428 A * | 7/2000 | Wagner | ..................... | B60R 9/10 224/511 |
| 6,250,425 B1 * | 6/2001 | Barnes | ...................... | E06C 5/02 224/310 |
| 6,257,534 B1 * | 7/2001 | Finley | .................. | B60R 9/0485 182/127 |
| 6,772,929 B1 * | 8/2004 | Stein | ......................... | B60R 9/06 224/455 |
| 7,210,721 B1 * | 5/2007 | Bell | ...................... | B60R 9/0485 224/310 |
| 7,845,468 B2 * | 12/2010 | Steblinski | .............. | E02D 17/08 211/175 |
| 9,574,400 B2 * | 2/2017 | Cox | ......................... | B60D 1/66 |
| 2007/0158379 A1 * | 7/2007 | Bell | ..................... | B60R 9/0485 224/535 |

* cited by examiner

*Primary Examiner* — Justin M Larson
(74) *Attorney, Agent, or Firm* — Richard Eldredge; Leavitt Eldredge Law Firm

(57) ABSTRACT

A ladder rack includes a base having a connection for engaging with a hitch receiver of a vehicle; an H frame connected to the base and supported above the base, the H frame having one or more horizontal arms extending between a first side and a second side; a first pair of L brackets attached to H frame and extending therefrom at a top position; a second pair of L brackets attached to the H frame and extending therefrom at a bottom position; a locking arm pivotally engaged with the second pair of L brackets and configured to pivot from an open position to a closed position; and a lock receiver having a first portion attached to the locking arm and a second portion attached to the H bracket, the lock receiver closes when the locking arm is in a closed position; the lock receiver is to receive a lock to hold the locking arm in the closed position.

5 Claims, 7 Drawing Sheets

US 12,252,097 B1

LADDER RACK AND METHOD OF USE

BACKGROUND

1. Field of the Invention

The present invention relates generally to ladder transport systems, and more specifically, to a ladder rack that provides for convenient transport of a variety of ladders, as well as providing for easy storage of the rack when not in use.

2. Description of Related Art

Ladder transport systems are well known in the art and are effective means to transport a ladder from one location to another, such as for work. Conventional systems may require the ladder to be placed inside a vehicle, or on a permanent rack attached to the vehicle. Both have drawbacks, as placing one inside a vehicle requires adequate space and a permanent rack may be inconvenient or unsightly when secured permanently to a vehicle.

Accordingly, although great strides have been made in the area of ladder rack systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
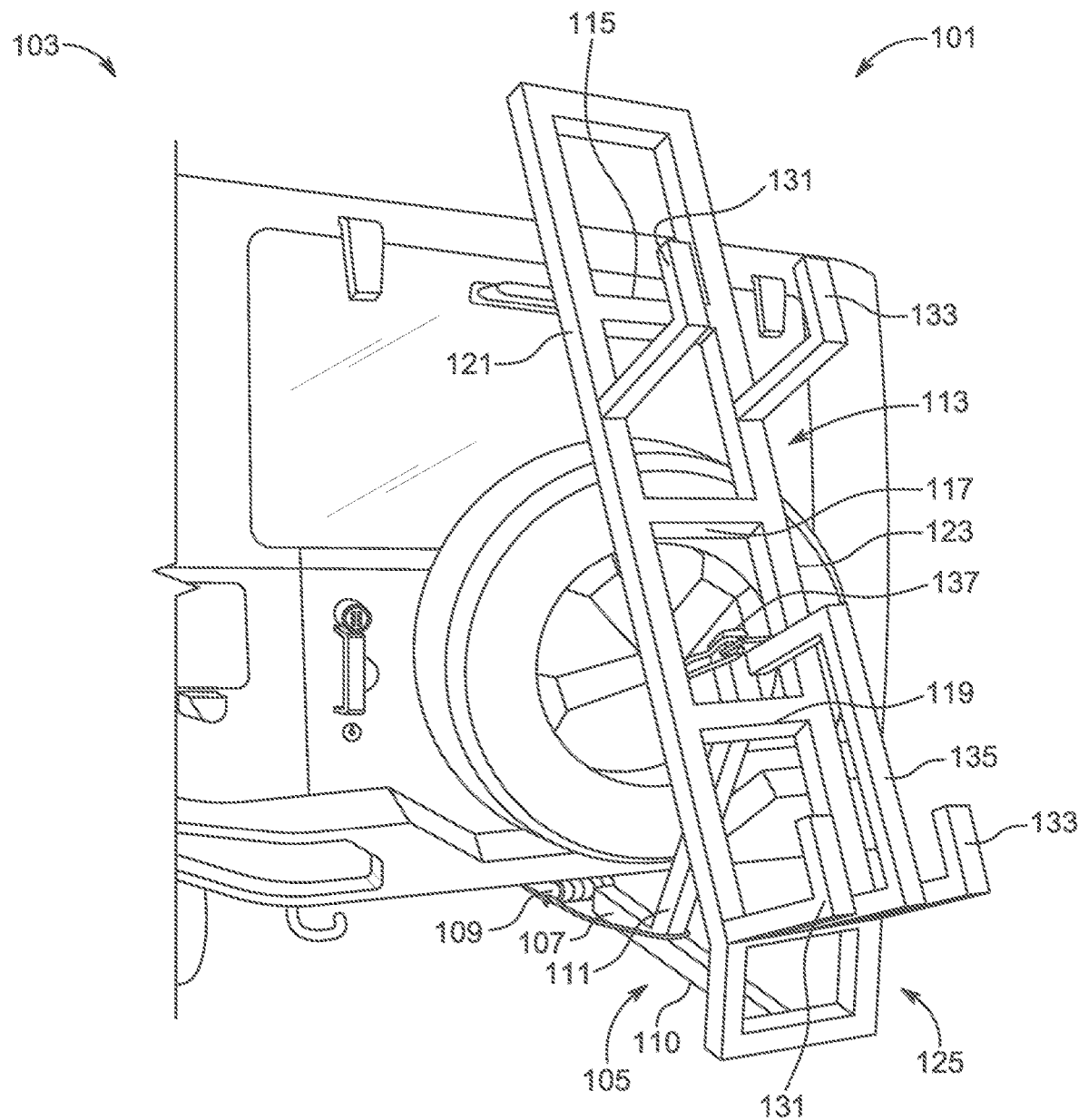
FIG. 1 is a back isometric view of a ladder rack attached to a vehicle in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional ladder transport systems. Specifically, the present invention can provide for easy transport of a variety of ladders and further is easily transported and removed from a vehicle as needed by the user. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a back isometric view of a ladder rack 101 attached to a vehicle 103 in accordance with a preferred embodiment of the present application. It will be appreciated that rack 101 overcomes one or more of the above-listed problems commonly associated with conventional ladder transport systems.

In the contemplated embodiment, rack 101 includes a base 105 having a connection 107 for engaging with a hitch receiver 109 of the vehicle. As shown, the base 105 may include a base support 110 having the connection 107 and a secondary support 111 extending away from the base support 110. This provides for stability and a means to secure the rack 101 to the vehicle 103.

Rack 101 further includes an H frame 113 connected to the base 105 and supported above the base, the H frame having one or more horizontal arms 115, 117, 119 extending between a first side 121 and a second side 123.

The H frame may further have a lower portion 125 that extends from the first side 121 and the second side 123 at an angle that is not 180 degrees.

The rack 101 further includes a first pair of L brackets 127, 129 attached to the H frame 113 and extending therefrom at a top position and a second pair of L brackets 131, 133 attached to the H frame 113 and extending therefrom at a bottom position.

Figure 5A:
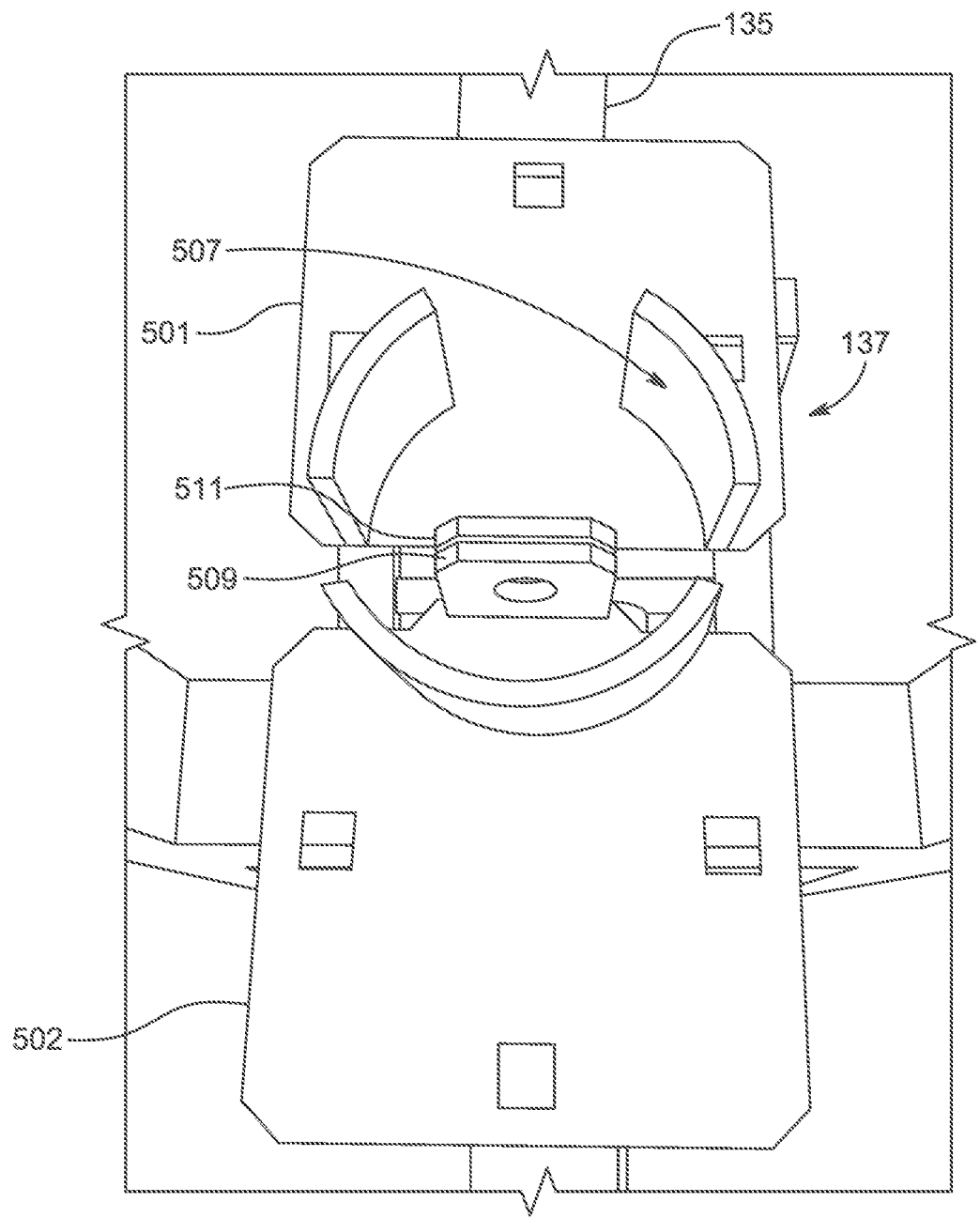
FIG. 5A is a top view of a lock receiver of the ladder rack of FIG. 1 in accordance with the present application.
Figure 5B:
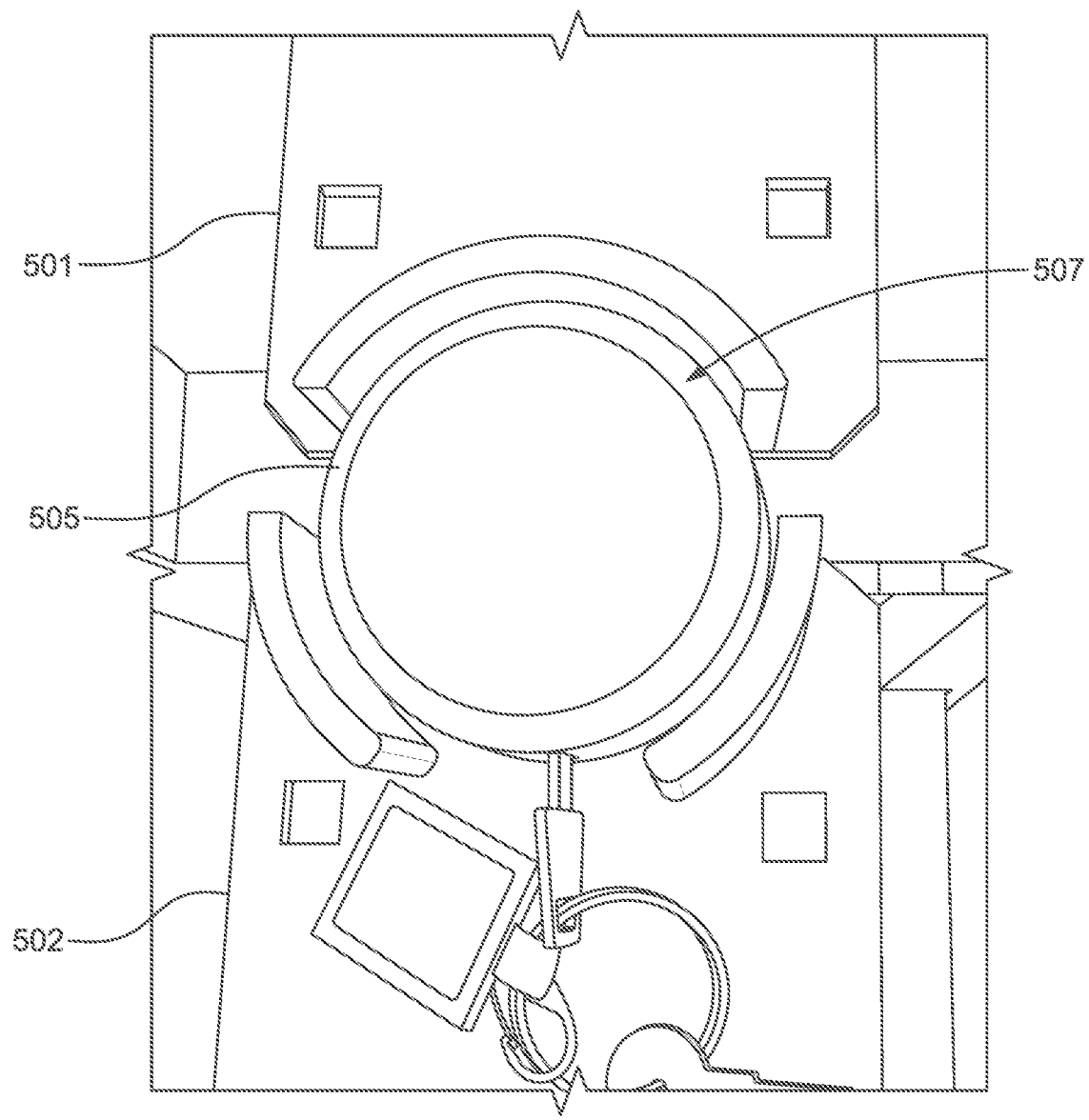
FIG. 5B is a top view of the lock receiver of FIG. 5A with a lock secured therein in accordance with the present application.

A locking arm 135 is pivotally engaged with the second pair 131, 133 of L brackets and configured to pivot from an open position to a closed position, as will be discussed in greater detail below. A lock receiver 137 having a first portion 501 attached to the locking arm 135 and a second portion 502 attached to the H frame 113 closes when the locking arm 135 is in a closed position and the lock receiver is configured to receive a lock 505 to hold the locking arm in the closed position, as shown in FIGS. 5A and 5B.

It should be appreciated that one of the unique features believed characteristic of the present application is the ability of the rack to easily be removed from the vehicle for storage or transport within the vehicle. In addition, the rack can easily receive a variety of ladders for resting within the pairs of L brackets, thereby providing for securing during transport. The locking arm allows for the ladders to be locked in place for security.

Figure 2:
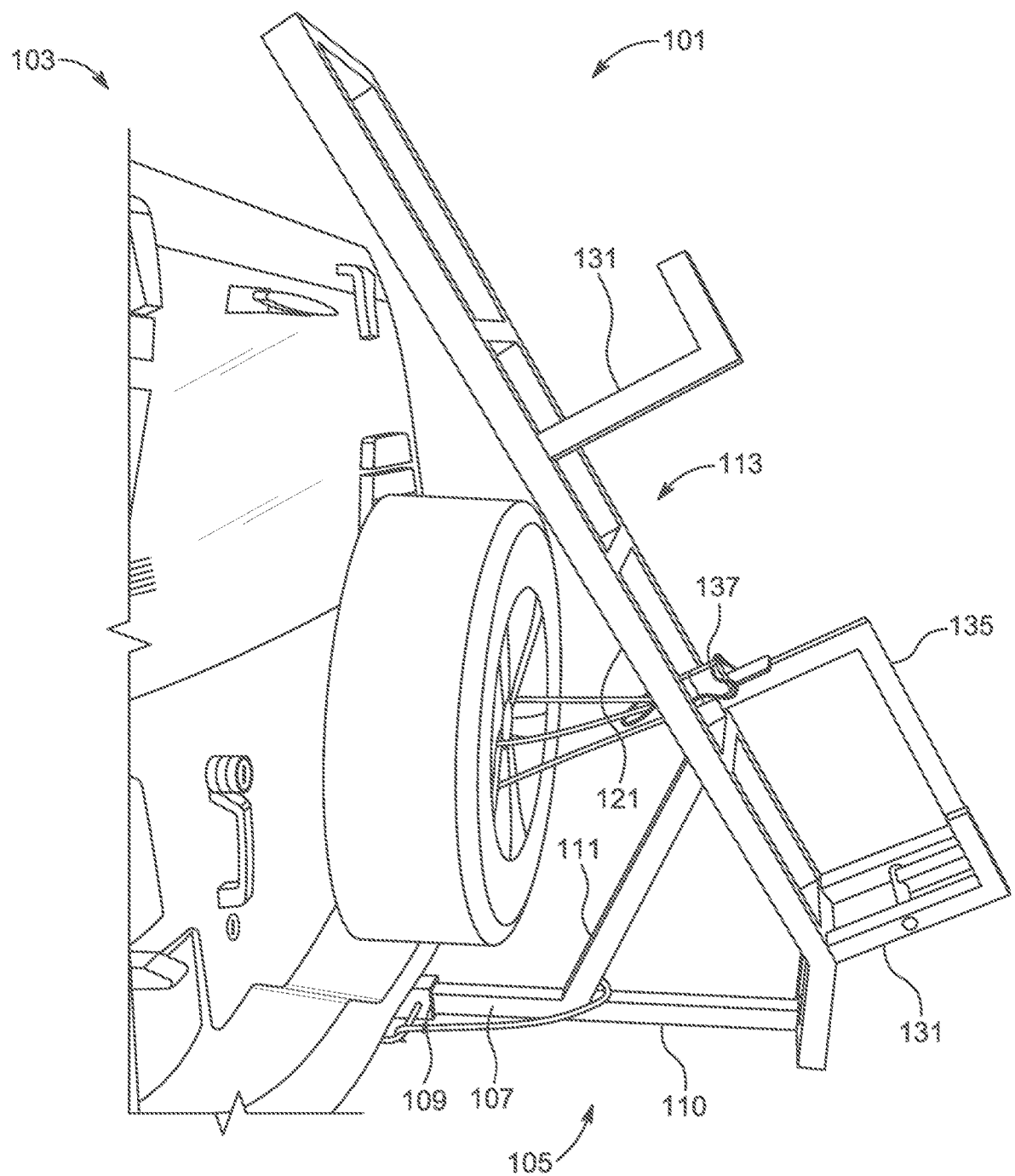
FIG. 2 is a side view of the ladder rack of FIG. 1 attached to the vehicle.

In FIG. 2, a side view further depicts the engagement of the rack 101 with vehicle 103 for clarity.

Figure 3:
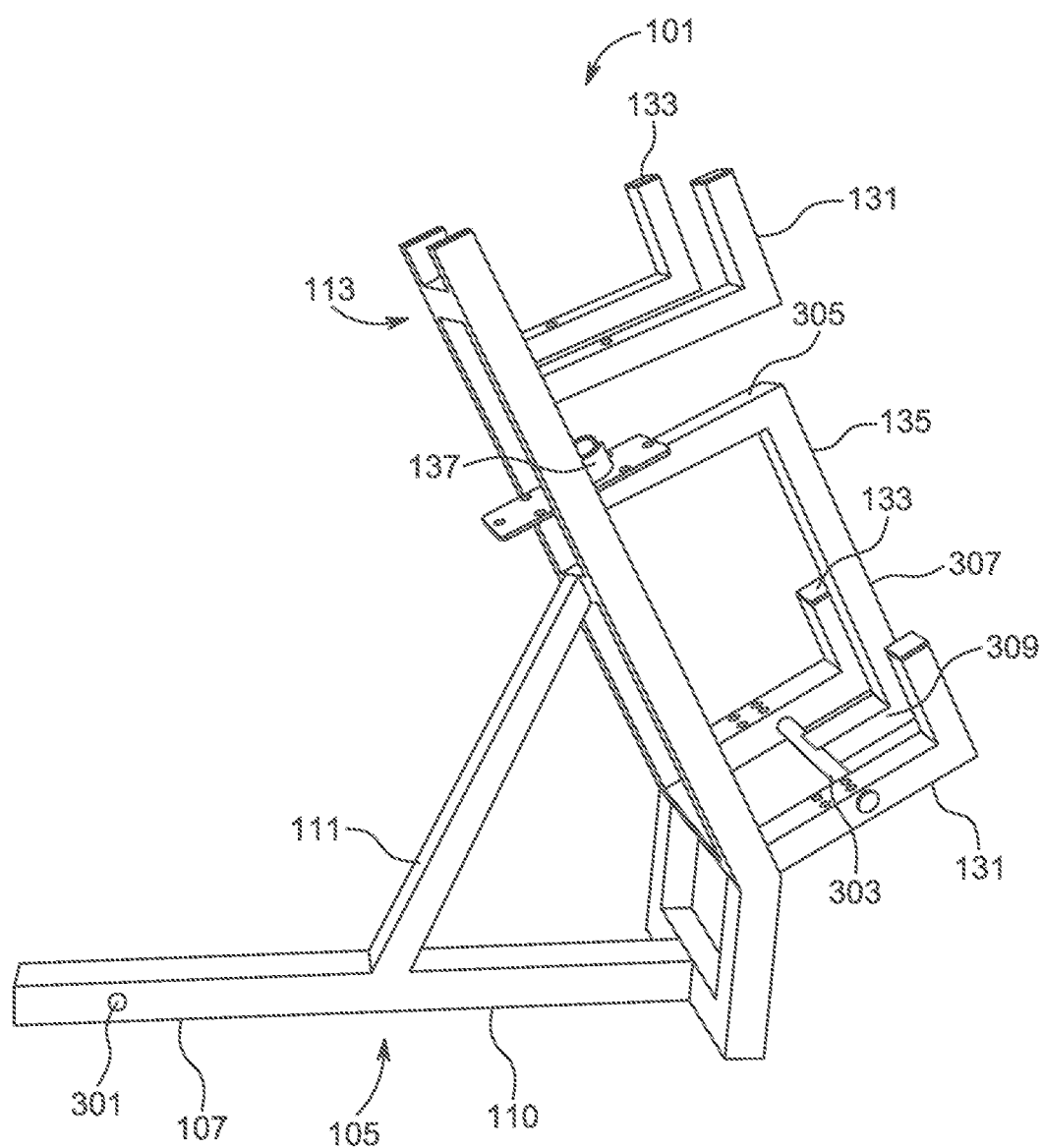
FIG. 3 is a side view of the ladder rack of FIG. 1 in accordance with the present application.
Figure 4:
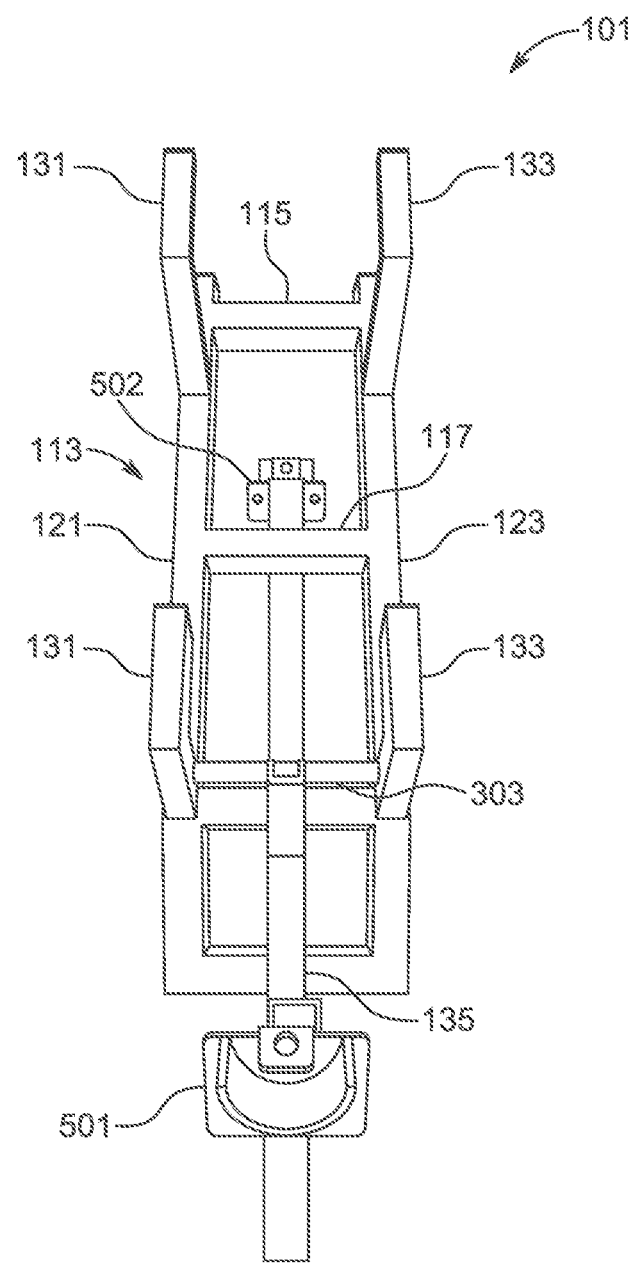
FIG. 4 is a front view of the ladder rack of FIG. 1 with the locking arm in an open position in accordance with the present application.

In FIG. 3, a side view of rack 101 is further shown for clarity. As shown, the connection 107 may include an aperture 301 for engagement with the hitch receiver. Further, as best shown in this figure, the locking arm 135 in the preferred embodiment is engaged with the second pair of L brackets 131, 133 via a swivel bar 303, the swivel bar 303 extending from a first of the second pair of L brackets to a second of the second pair of L brackets as shown and allowing for the locking arm 135 to open and close. In FIG. 4, the locking arm 135 is shown in the open position, wherein the first and second pairs of L brackets are open to receive a ladder.

In the preferred embodiment, the locking arm 135 includes a first side 305 attached to a second side 307 at approximately a right angle and the second side 307 attached to a third side 309 at approximately a right angle.

Referring again to FIGS. 5A and 5B, the lock receiver 137 is shown. The lock receiver having the first portion 501 attached to the locking arm 135 and a second portion 502 attached to the H frame 113. The lock receiver forming a circular opening 507 with a first tab 509 and a second tab 511 that come together to engage with lock 505. The lock 505 then holding the locking arm 135 to the H frame 113 to lock over the top of ladders and hold them in place securely.

Figure 6:
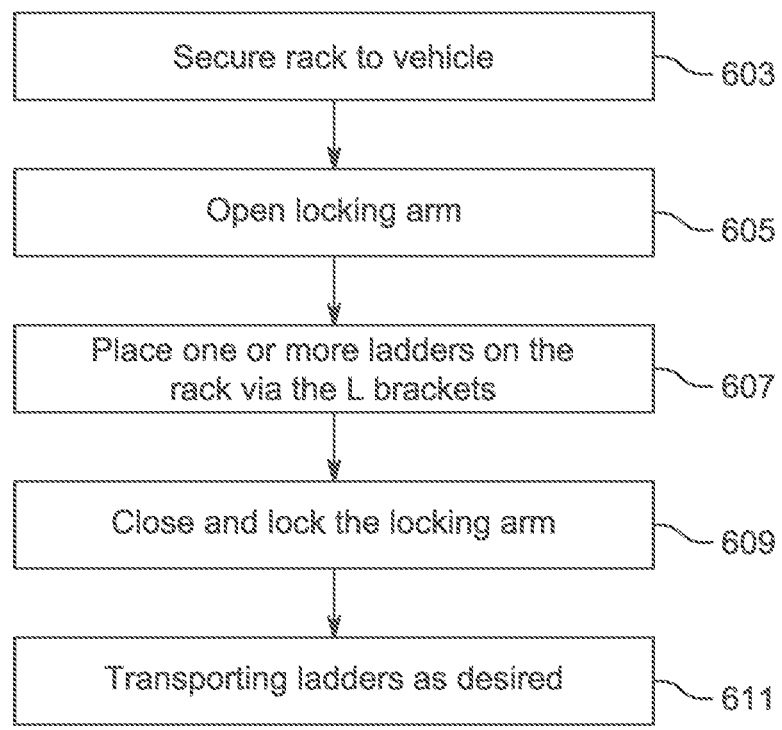
FIG. 6 is a flowchart of a method of use of the ladder rack of FIG. 1 in accordance with the present application.

In FIG. 6, a flowchart 601 depicts a method of use of ladder rack 101. During use, the user will secure the ladder rack to the vehicle via the connection and hitch receiver, as shown with box 603. The user will then open the locking arm and place one or more ladders on the rack via the pairs of L brackets, as shown with boxes 605, 607. Next the user will pivot the locking arm upwards and close the locking arm over the ladders and lock it in place, as shown with box 609. The one or more ladders are then securely transported to a desired location, as shown with box 611.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A ladder rack, comprising:
    a base having a connection for engaging with a hitch receiver of a vehicle;
    an H frame connected to the base and supported above the base, the H frame having one or more horizontal arms extending between a first side and a second side;
    a first pair of L brackets attached to H frame and extending therefrom at a top position;
    a second pair of L brackets attached to the H frame and extending therefrom at a bottom position;
    a locking arm pivotally engaged with the second pair of L brackets and configured to pivot from an open position to a closed position; and
    a lock receiver having a first portion attached to the locking arm and a second portion attached to the H frame, wherein the lock receiver closes when the locking arm is in a closed position;
    wherein the lock receiver is configured to receive a lock to hold the locking arm in the closed position.

2. The ladder rack of claim 1, wherein the base further comprises:
    a base support having the connection and a secondary support extending away from the base support and attached to the H frame at one of the one or more horizontal arms.

3. The ladder rack of claim 1, wherein the locking arm is pivotally engaged with the second pair of L brackets via a swivel bar, the swivel bar extending from a first of the second pair of L brackets to a second of the second pair of L brackets.

4. The ladder rack of claim 1, wherein the locking arm includes a first side attached to a second side at approximately a right angle and the second side attached to a third side at approximately a right angle.

5. The ladder rack of claim 1, wherein the lock receiver includes a circular opening with a first tab and a second tab, the circular opening to receive the lock and the first tab and the second tab to be locked together via the lock.

* * * * *